United States Patent [19] [11] Patent Number: 4,753,383
Focke et al. [45] Date of Patent: Jun. 28, 1988

[54] HINGE-LID PACK FOR CIGARETTES OR THE LIKE

[75] Inventors: Heinz Focke, Verden; Hugo Mutschall, Kirchlinteln, both of Fed. Rep. of Germany

[73] Assignee: Focke & Co. (GmbH & Co.), Verden, Fed. Rep. of Germany

[21] Appl. No.: 846,450

[22] Filed: Mar. 31, 1986

[30] Foreign Application Priority Data

May 2, 1985 [DE] Fed. Rep. of Germany ....... 3515775

[51] Int. Cl.[4] .............................................. B65D 5/66
[52] U.S. Cl. ................... 229/160.1; 229/106; 206/271; 206/273
[58] Field of Search ............... 206/265, 268, 271, 273; 229/16 A, 44 CB, 106, 160.1; 493/910, 911

[56] References Cited

U.S. PATENT DOCUMENTS

| D. 279,507 | 7/1985 | Schechter et al. ................. D27/47 |
| 1,324,578 | 12/1919 | Bard . |
| 1,996,232 | 4/1935 | Darragh ........................ 206/45.11 |
| 3,068,760 | 12/1962 | Gross . |
| 3,708,108 | 1/1973 | Rosenburg, Jr. ............... 229/44 CB |
| 3,944,066 | 3/1976 | Niepmann ....................... 206/273 |
| 4,020,988 | 5/1977 | Kipp ................................ 229/106 |
| 4,084,393 | 4/1978 | Focke ............................... 53/137 |
| 4,216,898 | 8/1980 | Davies ............................. 206/273 |
| 4,251,022 | 2/1981 | Focke ........................... 229/44 CB |
| 4,283,190 | 8/1981 | Williams .......................... 493/131 |
| 4,349,345 | 9/1982 | Bodendoerfer ................... 493/295 |
| 4,466,536 | 8/1984 | Zeitel .............................. 206/273 |
| 4,551,126 | 11/1985 | Johnson, Jr. et al. ............ 493/453 |
| 4,562,687 | 1/1986 | Green, Jr. ......................... 53/383 |

FOREIGN PATENT DOCUMENTS

| 654558 | 12/1962 | Canada ......................... 229/44 CB |
| 58760 | 5/1941 | Denmark ...................... 229/44 CB |
| 1008196 | 5/1957 | Fed. Rep. of Germany ... 229/44 CB |
| 1161513 | 1/1964 | Fed. Rep. of Germany ... 229/44 CB |
| 2334190 | 1/1975 | Fed. Rep. of Germany ...... 206/268 |
| 596645 | 1/1948 | United Kingdom .......... 229/44 CB |
| 1338689 | 11/1973 | United Kingdom ............. 206/268 |
| 2011353 | 7/1979 | United Kingdom ............. 206/273 |

Primary Examiner—David T. Fidei
Attorney, Agent, or Firm—Sughrue, Mion, Zinn, Macpeak & Seas

[57] ABSTRACT

An essentially cuboid hinge-lid pack with a pack part (10) and a hinge lid (11) is rounded in the region of vertical longitudinal edges (26,27) and lid longitudinal edges (28 and 29) and in the region of collar longitudinal front edges (30). The dimensions of the rounded portions of the longitudinal edges (26 and 30) are such that they correspond to the dimensions of cigarettes, so that the latter can fit into the rounded corners inside the hinge-lid pack. Measures for locking the hinge lid (11) in the closed position are also provided.

8 Claims, 7 Drawing Sheets

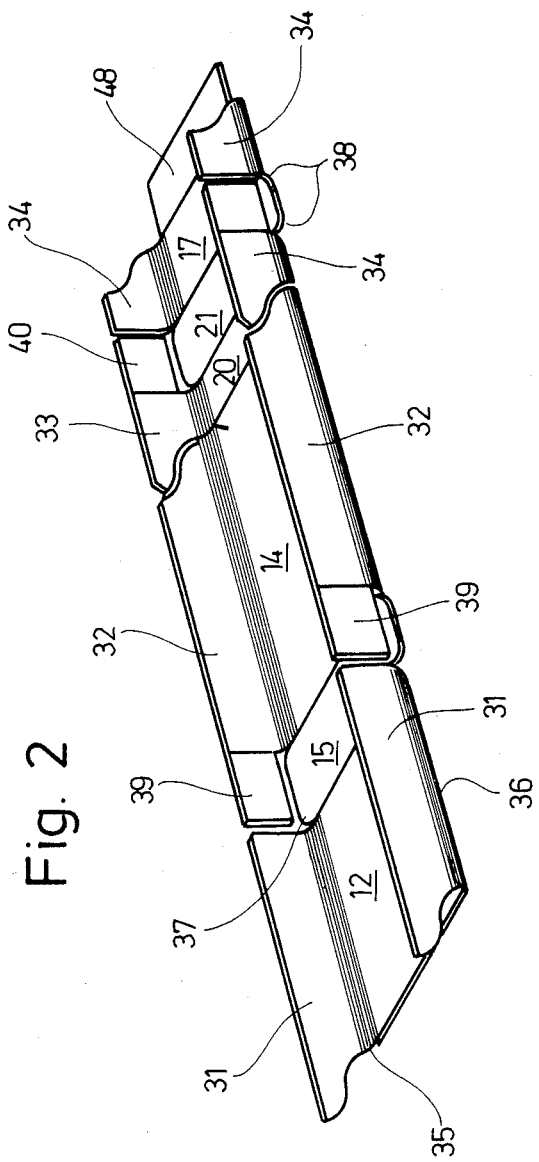
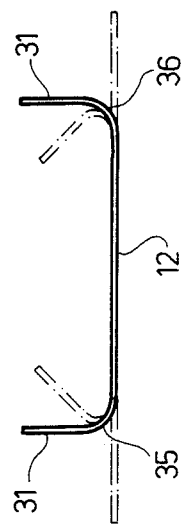

HINGE-LID PACK FOR CIGARETTES OR THE LIKE

BACKGROUND OF THE INVENTION

The invention relates to a hinge-lid pack consisting of foldable material, such as cardboard or the like, of essentially cuboid shape, especially for receiving a cigarette group wrapped in an inner blank (tin-foil block), with a pack part and with a hinge lid which is articulated on a rear wall of the latter and which, in the closed position, surrounds a collar connected to the pack part.

The term "hinge-lid pack" is also used for this type of pack. Because of the relatively firm packaging material (thin cardboard), packs of this type are relatively stable dimensionally. Longitudinal and transverse edges of the hinge-lid pack for the limitation of walls have hitherto been sharp without exception. This is also one reason for the considerable outlay in terms of material for this type of pack which is popular in practise.

SUMMARY OF THE INVENTION

The object on which the invention is based is to construct a hinge-lid pack of the type mentioned in the introduction, whilst at the same time preserving the constructive design and functionality, in such a way that the outlay in terms of material is reduced in comparison with conventional hinge-lid packs.

To achieve this object, the hinge-lid pack according to the invention is characterised in that (vertical) longitudinal edges of the pack part, of the hinge lid and of the collar are rounded, the radius of the rounded portion corresponding (approximately) to that of a cigarette.

The rounded longitudinal edges ensure a saving of material, in the first place because the hinge-lid pack matches the outer contour of the pack content, in particular the cigarette group, closely and positively. Where conventional "angular" hinge-lid packs are concerned, the material is not utilised as effectively as possible in the region of the longitudinal edges, since a cavity remains here relative to the cigarettes located at the corners. In the invention, the tin-foil block is, in practice, surrounded exactly and positively, therefore ensuring a saving of material.

Furthermore, according to the invention, a saving of material is also achieved by making inner and outer side tabs and lid side tabs with less width than in conventional hinge-lid packs. To form side walls and lid side walls, these narrower side tabs and lid side tabs rest against one another only in the region outside the rounded portions of the longitudinal edges. The corresponding side tabs and lid side tabs consequently require less material.

However, another advantage is the handling of the pack, since it can be grasped more comfortably because of the rounded longitudinal edges.

According to a further proposal, the collar is equipped, in the region of the rounded portion, with a locking tongue formed by stamping, which projects slightly beyond the lateral contours of the collar and which, in the closed position of the hinge lid, engages behind an edge of the inner lid side tab. To open the hinge-lid pack by swinging the hinge lid back, the locking tongue is deformed so that the lid can be actuated in the usual way.

In a further proposal according to the invention for locking the hinge lid in the closed position, a downward-directed folded-round anchoring tab is formed in the region of a collar front wall and, in the closed position of the hinge lid, interacts with a counter-edge formed on the inside of the latter in the region of the front wall, in particular with the top edge of a reinforcing strip on the inside of the hinge lid.

Further features of the invention relate to the design of the hinge-lid pack and to its manufacture.

BRIEF DESCRIPTION OF THE DRAWINGS

Exemplary embodiments of a hinge-lid pack are explained below with reference to the drawings. In the drawings:

FIG. 2 shows, likewise in perspective, a blank for a hinge-lid pack according to FIG. 1, in an intermediate folded position, FIG. 3 shows a cross-section through the blank according to FIG. 2.

DESCRIPTION OF THE PREFERRED EMBODIMENT

Figure 1:
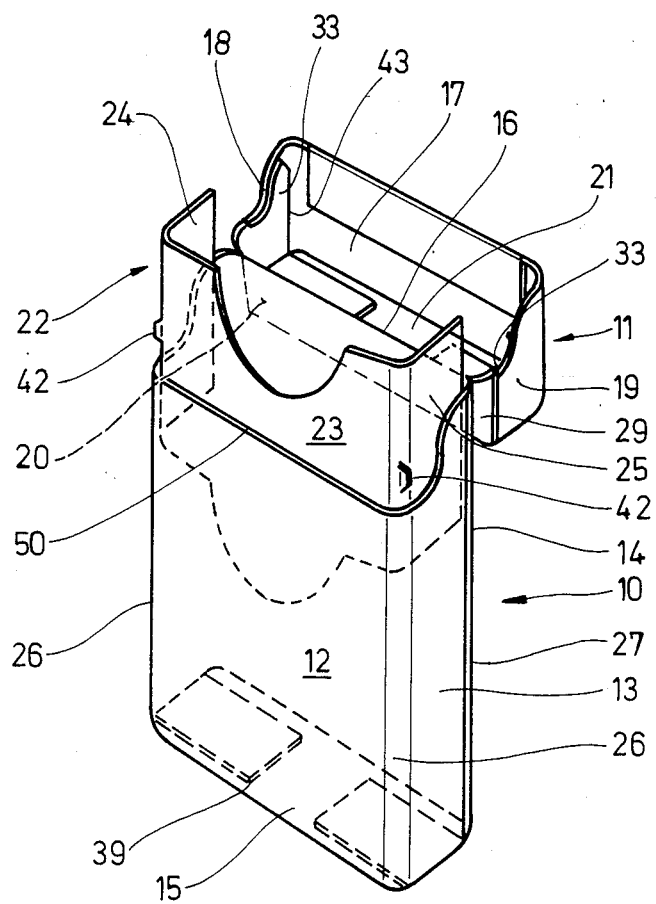
FIG. 1 shows a perspective representation of a hinge-lid pack with rounded longitudinal edges.

The hinge-lid packs shown in the drawings, made of thin paperboard or thin cardboard, serve for receiving cigarettes, in particular a cigarette group which is wrapped in an inner blank, especially a tin-foil blank (not shown). The approximately cuboid tin-foil block fits positively into the hinge-lid pack.

According to FIG. 1, the hinge-lid pack consists of a pack part 10 and a hinge lid 11. The former is formed by a front wall 12, side walls 13, a rear wall 14 and a bottom wall 15. The hinge lid 11 is connected to the rear wall 14 in the region of a hinge line 16.

In a similar way to the pack part 10, the hinge lid 11 consists of a lid front wall 17, lid side walls 18 and 19, a lid rear wall 20 (joined to the rear wall 14 of the pack part 10) and a lid top wall 21.

In keeping with the conventional design of a hinge-lid pack, a collar 22, consisting of a collar front wall 23 and collar side walls 24 and 25, is inserted into the pack part 10. The lower part of the collar 22 is connected to the front wall 12 and to the side walls 13. An upper region projects from the pack part 10 and, in the closed position, is surrounded by the hinge lid 11.

Figure 7:
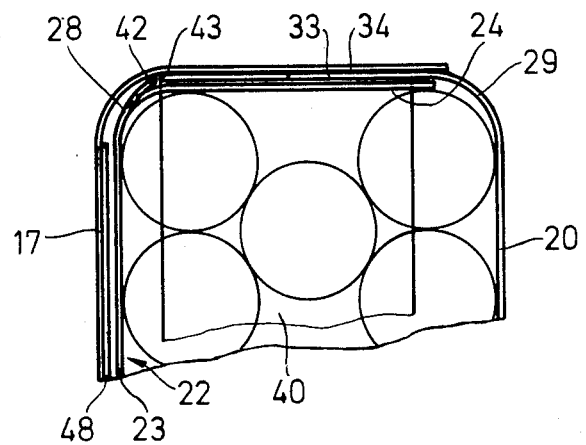
FIG. 7 shows a horizontal section through a region of the hinge lid in the closed position.

Vertical longitudinal edges 26,27 of the pack part 10, lid longitudinal edges 28 and 29 in the form of extensions of these and front collar longitudinal edges 30 are highly rounded, specifically in such a way that the rounding of the abovementioned longitudinal edges corresponds to that of the cigarettes to be packaged (FIG. 7). Accordingly, the longitudinal edges 26 to 30 of a cross-section in the form of a quarter circle have (approximately) the same radius as the cigarettes, so that the latter, together with the tin-foil blank surrounding them, closely match the contours of the hinge-lid pack in the region of these longitudinal edges 26 to 30.

Figure 4:
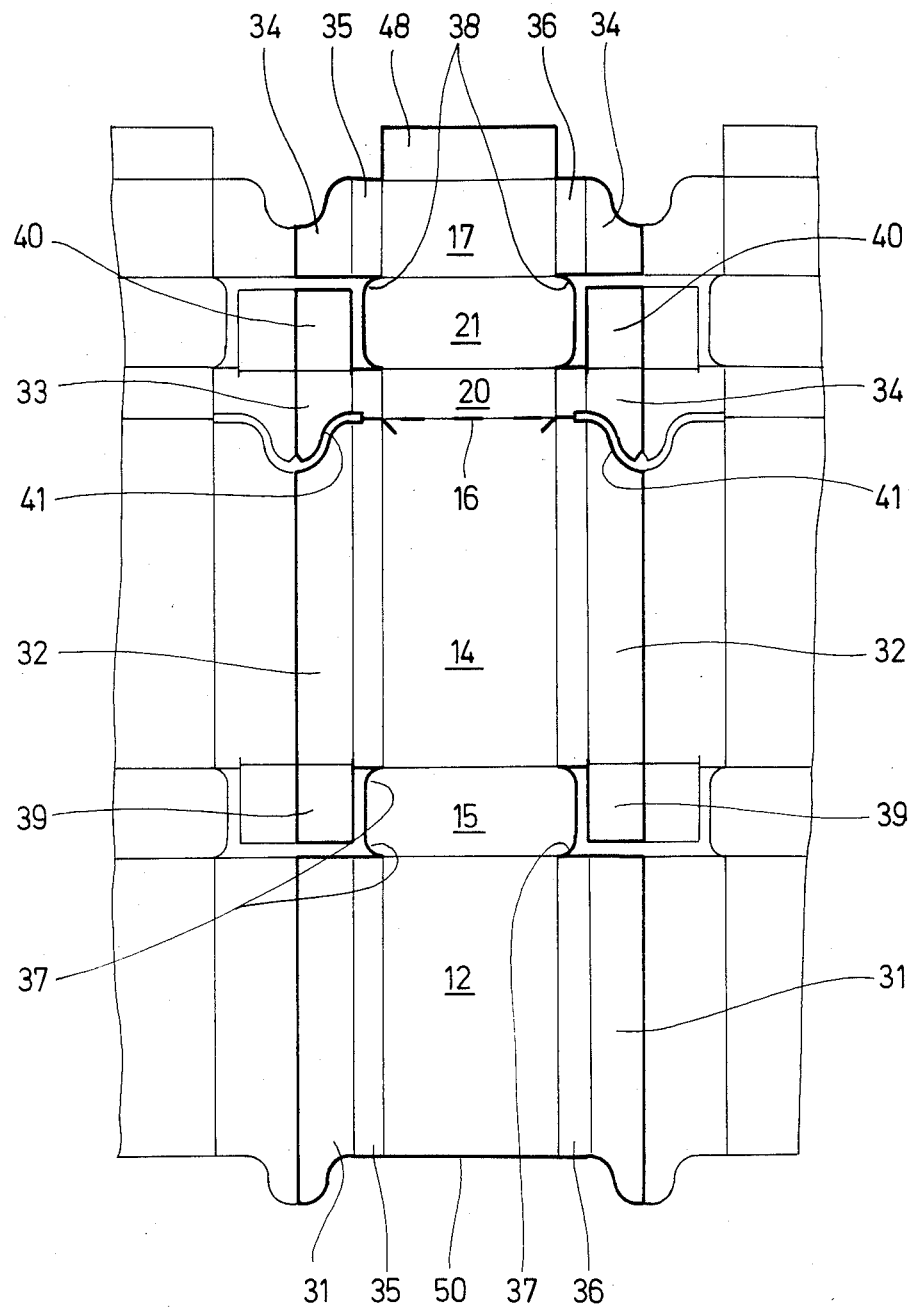
FIG. 4 shows the arrangement of blanks for a hinge-lid pack according to FIG. 1 within a continuous sheet of packaging material.

A hinge-lid pack having vertical longitudinal edges 26 to 29 rounded in this way can be produced, for example, from a blank according to FIG. 4. In accordance with the side-closing principle of construction of the hinge-lid pack, the side walls 13 are formed by side tabs 31 and 32 overlapping one another. Appropriately designed lid side tabs 33 in the region of the lid rear wall 20 and lid side tabs 34 in the region of the lid front wall 17 are provided for the lid side walls 18 and 19. Between the side tabs 31 to 34, on the one hand, and the adjacent walls of the hinge-lid pack or blank (FIG. 4), there is a strip of material 35,36 which serves to form the curved rounded longitudinal edges 26 to 30. The side tabs 31,32 and lid side tabs 33,34 are consequently given a smaller width than the total width of the hinge-lid pack, in particular less the dimensions of the rounded portions or strips of material 35,36. The side tabs 31 and 32 and lid side tabs 33 and 34 which are assigned to one another respectively overlap one another over their entire surface.

The bottom wall 15 and the lid top wall 21 are provided with rounded corners 37 and 38 which respectively fit positively against the rounded longitudinal edges 26,27 and lid longitudinal edges 28,29 respectively at the bottom and top.

As is already known in principle, the inner side tabs 32 and the likewise inner lid side tabs 33 have bottom corner tabs 39 and lid corner tabs 40 attached respectively to them. In the ready-folded hinge-lid pack, these rest against the inside of the bottom wall 15 and the lid top wall 21 respectively. In the present design of the hinge-lid pack, the bottom corner tabs 39 and the lid corner tabs 40 have less width than the total width of the hinge-lid pack, in particular are approximately as wide as the adjoining side tabs 32 and lid side tabs 33.

Figure 5:
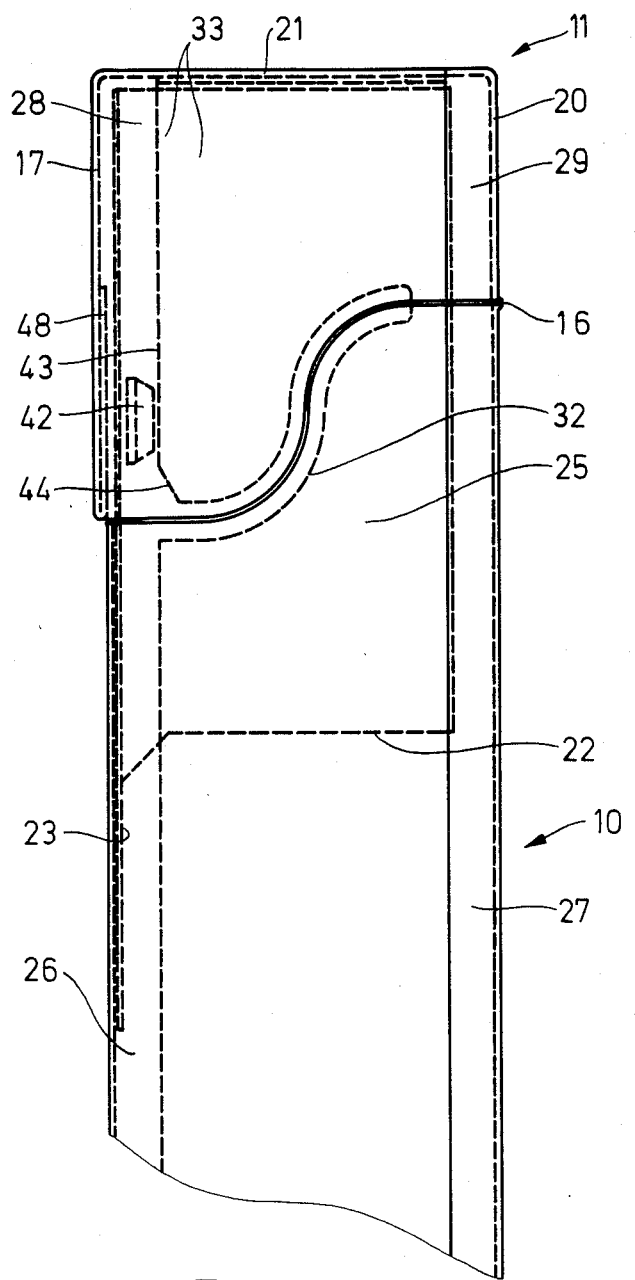
FIG. 5 shows a side view, on an enlarged scale, of the upper part of the hinge-lid pack in the closed position.
Figure 6:
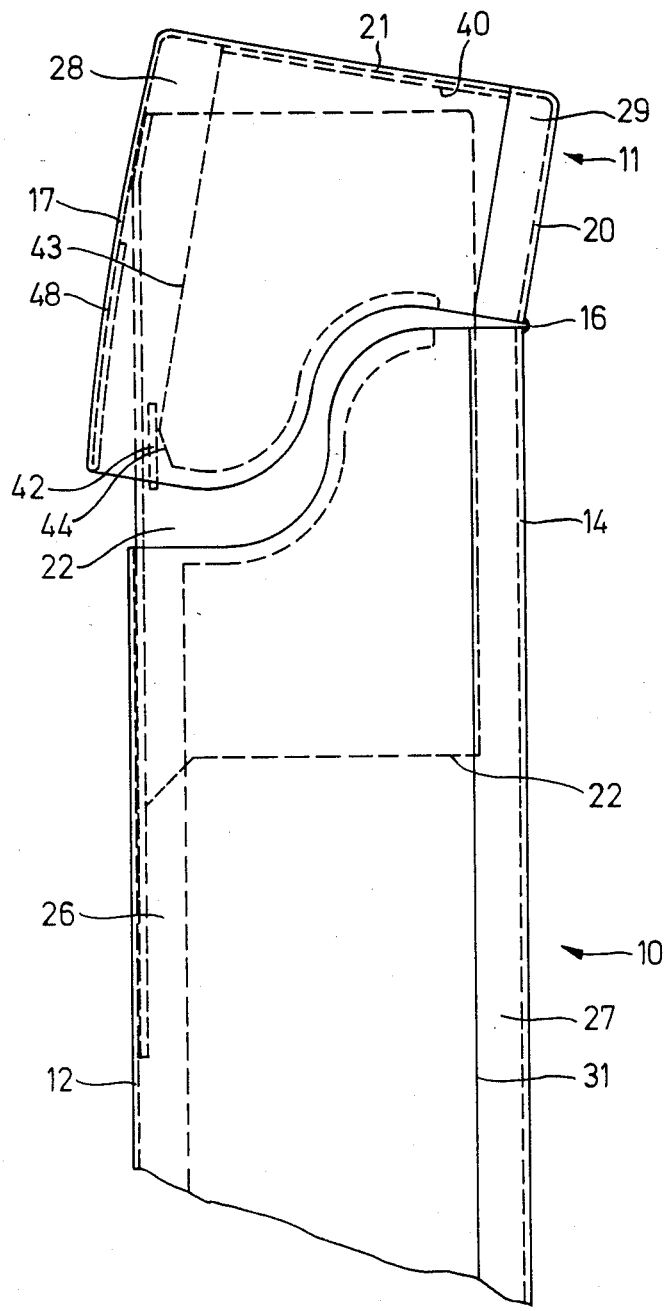
FIG. 6 shows a representation corresponding to that of FIG. 5 during an opening phase of the hinge lid.

Furthermore, in the present case, an appropriate (undulating, S-shaped) stamping 41 between the inner side tabs 32 and lid side tabs 33 ensures that these spring back inwards relative to the associated outer side tabs 31 and lid side tabs 34 respectively (FIGS. 5 and 6). As a result of this offset between the inner and outer side tabs 31 to 34, any inexact relative positions between the side tabs resting against one another are compensated.

The hinge-lid pack is provided with a locking means for securing or stabilising the closed position of the hinge lid 11. For this purpose, the collar 22 is provided in the lateral region, in particular in the region of the collar longitudinal edges 30, with a locking tongue 42 which, in the operative position, projects slightly beyond the contours of the collar 22. The locking tongue 42 is formed by an approximately U-shaped stamping in the region of the transition between the collar side wall 24,25 and the collar front wall 23. The locking tongue 42 which is obtained and projects in this way is in the position in which, when the hinge lid 11 is closed, a front edge 43 of the inner lid side tab 33 engages behind the locking tongue 42 or is stressed by the latter towards the closed position. To open the hinge-lid pack, the hinge lid 11 is pivoted in the usual way, the front edge 43 of the lid side tab 33 at the same time overcoming the retaining force exerted by the locking tongue 42. To make this opening action easier, according to FIGS. 5 and 6 a bevel 44 is formed in the region of the bottom front corner of the inner lid side tab 33.

Figure 9:
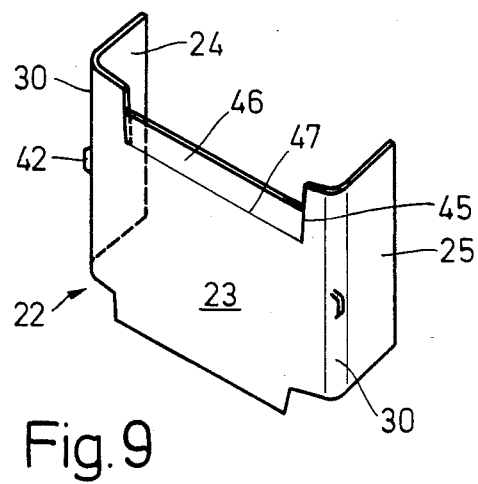
FIG. 9 shows, likewise in a perspective representation, a collar as a detail of the hinge-lid pack according to FIG. 8.
Figure 8:
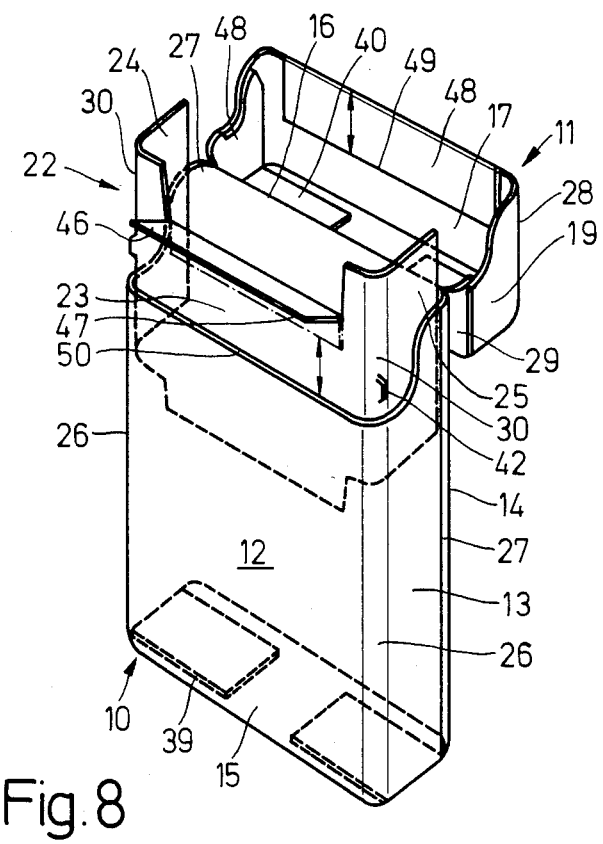
FIG. 8 shows another embodiment of a hinge lid in a representation corresponding to that of FIG. 1.

An additional or alternative locking means for the hinge lid 11 in the closed position is illustrated in FIGS. 8 and 9. The collar front wall 23 is provided with an anchoring tab 46 by means of severing cuts 45 adjacent to the collar longitudinal edges 30 and at a distance from these. This anchoring tab 46 extends over a part region of the collar front wall 23. The anchoring tab 46, by being folded round, is brought into a position in which it is directed essentially downwards. A lower transverse edge 47 serves for locking the hinge lid 11.

The latter, in the region of the lid front wall 17, is provided on the inside with a reinforcing strip 48 which is folded round against the inside of the lid front wall 17 and which is fastened here by glueing. A likewise transverse top edge 49 of the reinforcing strip 48 assumes a position in which, when the hinge-lid pack is closed, it rests against the downward-pointing transverse edge 47 of the anchoring tab 46. The latter is not fastened to the collar front wall 23 by glueing or in any other way, but can pivot freely. Consequently, when the hinge lid 11 is opened and closed, the anchoring tab 46 can follow the movements of the lid front wall 17. At the same time, the dimensions are selected so that the width of the reinforcing strip 48 corresponds to the distance between the downward-pointing transverse edge 47 of the anchoring tab 46 and a top pack edge 50 of the front wall 12. The anchoring tab 46 and the reinforcing strip 48 thereby engage positively in the closed position.

In the manufacture of a hinge-lid pack of the present design with rounded longitudinal edges 26 to 29, the procedure, according to FIGS. 2 and 3, is first to preform the elongate one-piece blank as regards the rounded portions of the longitudinal edges 26 to 29. The blank thereby acquires an essentially U-shaped form in crosssection. At the same time, the raised side tabs are deformed so far inwards that they assume a vertical position as a result of the restoring forces. After the rounded longitudinal edges 26 to 29 have been formed, the blank is delivered for further folding and filling.

We claim:

1. Hinge-lid pack, consisting of foldable material, such as cardboard or the like, of essentially cuboid shape, especially for receiving a cigarette group wrapped in an inner blank, with a pack part and with a hinge lid which is articulated on a rear wall of the latter and which, in the closed position, surrounds a collar connected to the pack part, characterized: in that vertical longitudinal edges (26,27; 28,29; 30) of the pack part (10), of the hinge lid (11) and of the collar (22) are rounded, the radius of the rounded portions corresponding approximately to that of a cigarette; in that a bottom wall (15) and a lid top wall (21) with rounded corners (37,38) fit flush against the associated walls positively in accordance with the dimensions of the rounded portions of the longitudinal edges (26 to 29) and without being connected to these; and in that side walls (13) and lid side walls (18,19) are formed respectively from side tabs (31,32) and lid side tabs (33,34) which lie on top of one another and the width of which is such that they overlap one another only in the region outside the rounded portions of the longitudinal edges (26 to 29); and further characterized in that bottom corner tabs (39), adjoining the inner side tabs (32), and lid corner tabs (40), adjoining the inner lid side tabs (33), are made with less width than the width of the bottom wall (15) and lid top wall (21), respectively so that they have a width approximately equal to the width of the side tabs (31) and lid side tabs (33) between the rounded portions of the longitudinal edges (26 to 29). and the width of which is such that they overlap one another only in the region outside the rounded portions of the longitudinal edges (26 to 29).

2. Hinge-lid pack according to claim 1 characterised in that inner side tabs (31) and lid side tabs (33) are at such a distance from one another, as a result of double stampings (41) undulating in the form of an S, that top and bottom edges of the inner side tabs (31) and of the lid side tabs (33) are respectively set back relative to the edges of the outer side tabs (32) and lid side tabs (34).

3. Hinge-lid pack according to claim 1, characterised in that the collar (22) has, in the lateral front region, a locking tongue (42) which is formed by a U-shaped or trapezoidal stamping and which, in the closed position, rests against an edge facing the lid front wall (17) of the hinge lid (11), in particular against a vertical front edge (43) of the inner lid side tab (33).

4. Hinge-lid pack according to claim 3, characterised in that the locking tongue (42) is arranged in the region of the rounded collar longitudinal edge (30), adjacent to the upper region of the pack part (10).

5. Hinge-lid pack according to claim 3 or 4, characterised in that, in the initial position, the locking tongue (42) is directed towards the rear wall (14) or lid rear wall (20).

6. Hinge-lid pack according to claim 3, characterised in that a bottom front corner of the inner lid side tab (33) is provided with a bevel (44).

7. Hinge-lid pack according to claim 3, characterised in that, in the closed position, the hinge lid (11) is fastened (additionally) in the region of the collar front wall (23) by an anchoring tab (46) which rests against the collar front wall (23) and which, in the closed position, interacts with a catch on the inside of the hinge lid (11), in particular with a top edge (49) of a reinforcing strip (48) resting against the inside of the lid front wall (17).

8. Hinge-lid pack according to claim 7, characterised in that the anchoring tab (46) is formed as part of the collar front wall (23) of appropriate dimensions, in particular by folding round a region of the latter downwards against the lower part of the collar front wall (23).

* * * * *